United States Patent [19]

Keep, Jr.

[11] E Re. 31,081

[45] Reissued Nov. 16, 1982

[54] RAILROAD SWITCH HEATER

[76] Inventor: Henry Keep, Jr., 88 E. Wharf Rd., Madison, Conn. 06443

[21] Appl. No.: 240,582

[22] Filed: Mar. 4, 1981

Related U.S. Patent Documents

Reissue of:

[64] Patent No.: 4,195,805
Issued: Apr. 1, 1980
Appl. No.: 890,637
Filed: Mar. 20, 1978

[51] Int. Cl.³ ..... E01B 7/24

[52] U.S. Cl. ..... 246/428; 126/271.2 B; 174/109; 191/27; 104/280

[58] Field of Search ..... 219/213, 536; 191/27; 246/428; 104/279, 280; 126/271.1, 271.2 B; 174/109; 338/214; 138/33; 252/62

[56] References Cited

U.S. PATENT DOCUMENTS

| | | | |
|---|---|---|---|
| 1,329,007 | 1/1920 | Paige | 246/428 |
| 1,524,223 | 1/1925 | Wells | 246/428 |
| 1,664,371 | 3/1928 | Moffett et al. | 246/428 |
| 1,959,107 | 5/1934 | Packer | 246/428 |
| 3,454,747 | 7/1969 | Hart | 338/214 X |

*Primary Examiner*—Sherman D. Basinger
*Attorney, Agent, or Firm*—Albert C. Johnston

[57] ABSTRACT

An apparatus for heating railroad rails such as those forming a railroad switch to prevent obstruction of the switch by ice and snow includes an elongate, bendable, high temperature heating cable disposed lengthwise against and along a side of the rail web. The cable comprises an electrical resistance heating wire encased in a high temperature resistant electrically insulating material confined inside a thermally conductive deformable metal sheath. An elongate, pliable heat insulating mat is disposed lengthwise against and along a length of the cable and portions of the rail web laterally adjacent thereto to prevent heat losses by convection or radiation from the cable length. An elongate substantially rigid casing member is fitted lengthwise over the mat and bears against the web side to confine the mat in place, and is held tightly in place against the rail web. Current is supplied at high [wattage] *watt density* through the resistance wire of the cable, generating heat which flows into the rail and through it and switch plates to a movable switch rail efficiently by conduction.

21 Claims, 8 Drawing Figures

TO JUNCTION BOX

TO JUNCTION BOX
TO JUNCTION BOX

RAILROAD SWITCH HEATER

Matter enclosed in heavy brackets [ ] appears in the original patent but forms no part of this reissue specification; matter printed in italics indicates the additions made by reissue.

This invention relates to an apparatus for heating a railroad rail to melt ice and snow therefrom and is particularly useful for heating the rails of a railroad switch that includes two fixed rails and two switch rails movable laterally toward and away from the fixed rails on underlying switch plates.

In climatic regions which frequently experience temperatures below freezing, malfunction of railroad rail switch mechanisms is often a problem. This difficulty is compounded in regions that experience regular precipitation in the form of snow or freezing rain.

Temperatures below freezing and accumulation of snow and ice result in malfunction of railroad switch mechanisms for two main reasons. First, when snow falls heavily or drifts between the fixed rail and the switch rail in large enough amounts it can pack and prevent proper engagement of the two rails. Second, when water freezes and forms ice around or on the pivot point of a movable switch rail, it may also prevent proper switch rail movement and, therefore, proper engagement of the two rails. Malfunction of the switch can cause railroad stock moving over it to derail and thus result in substantial property damage or personal injury.

The heating of a railroad rail switch involves needs for reliability of the heating apparatus, safety and efficiency in its operation and economy of production and installation of its component parts, with assurance that failures of operation due to burn-out or other cause will not occur over long periods of service, during which the apparatus may be unattended by persons familiar with its construction. It is also important that the apparatus be susceptible to prompt repair at the switch location in the event of being damaged by accident or otherwise.

So far as the applicant is aware, these needs have not been met satisfactorily by the railroad switch heaters known and used heretofore, although various methods and apparatus have been proposed for heating railroad rail switches to prevent or to remedy obstruction of the switches by ice or snow.

The principal object of the present invention is to provide a new and improved apparatus for heating a railroad rail, and particularly for heating rails that comprise a railroad switch, in a reliable, safe, efficient and economical manner that will meet satisfactorily the needs noted above.

It is another object of the invention to provide an apparatus and method whereby the rails of a railroad rail switch are heated predominantly by conduction, with relatively little loss of heat from the regions of the heating elements by convection or radiation, the heat being supplied to the fixed rails of the switch from their outer sides and being conducted through these rails and the underlying switch plates sufficiently to keep the movable switch rails suitably heated.

According to the present invention, an elongate, bendable, high temperature electrical heating cable is disposed lengthwise against and along a side of the web of the rail to be heated. The cable comprises an electrical resistance heating wire encased in high temperature resistant electrically insulating material confined inside a thermally conductive deformable metal sheath. The confining sheath and the insulating material encasing the cable are structures which will expand and contract to nearly the same extent as the resistance wire over the wide ranges of temperature that exist whenever the wire is heated or is allowed to cool from the heating condition. An elongate, pliable heat insulating mat is disposed lengthwise against and along a length of the cable and portions of the rail web laterally adjacent the cable and is held in place by an elongate, substantially rigid casing member which is fitted lengthwise over the mat and bears against the rail web and is secured tightly in place by suitable fastening means. The mat prevents major losses of heat by convection or radiation from the covered cable length. At times of freezing weather conditions, current at high [wattage]] *watt density* is supplied [to] *through* the heating wire, causing the cable fixed against the rail to be heated with conduction of most of the heat directly into the rail at the heated rail length, and also underlying switch plates and a switch rail displaceable on them, will be heated sufficiently by conduction to prevent accumulation of ice or snow.

The present invention also incorporates features which ease installation of the rail heating apparatus, and a connector construction is provided for connecting the heating cable safety to a source of current.

Other objects, features and advantages of the invention will be pointed out in or will be understood from the following detailed description and the accompanying drawings of illustrative embodiments.

IN THE DRAWINGS

Figures 1, 7, 8:
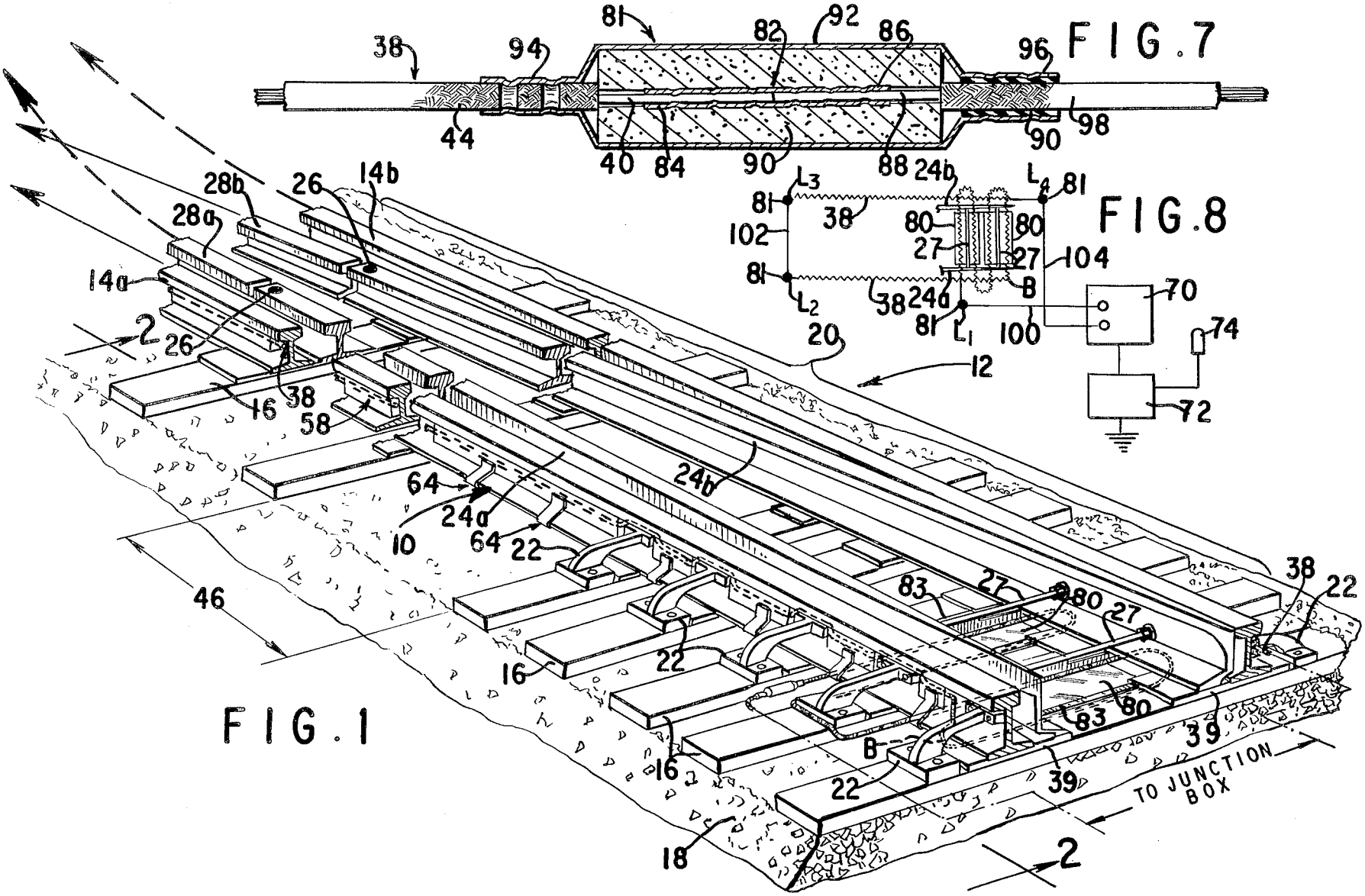
FIG. 1 is a perspective view of a railroad switch on which a rail heating apparatus constructed in accordance with the invention is installed.
FIG. 7 is a vertical cross-sectional view through a connector assembly for connecting the heating cable of the apparatus of the invention to a current supply.
FIG. 8 is a schematic diagram of an electrical circuit for the apparatus.

FIG. 1 illustrates a first embodiment of the apparatus of the present invention, generally indicated at 10, installed on a railroad rail switch, generally indicated at 12, to prevent obstruction of the switch by ice and snow. The switch comprises two fixed track rails 14a and 14b that are attached in a manner described below to a plurality of rail ties 16 firmly supported on a road bed 18, usually of concrete or crushed rock. The fixed rails are further supported laterally at their outer sides along a reach 20 of the switch by a series of rail braces 22 which are spaced apart and each of which is secured by suitable means such as spikes to a tie 16.

The railroad rail switch further comprises two switch rails 24a and 24b, each of which is mounted to swing laterally toward and away from the inner side of the fixed rail with which it is associated, above a pivot point 26. Switch rail 24a leads into a rail 28a of the side track, and switch rail 24b leads into a rail 28b of the main track.

Figures 2, 3, 4, 5, 6:
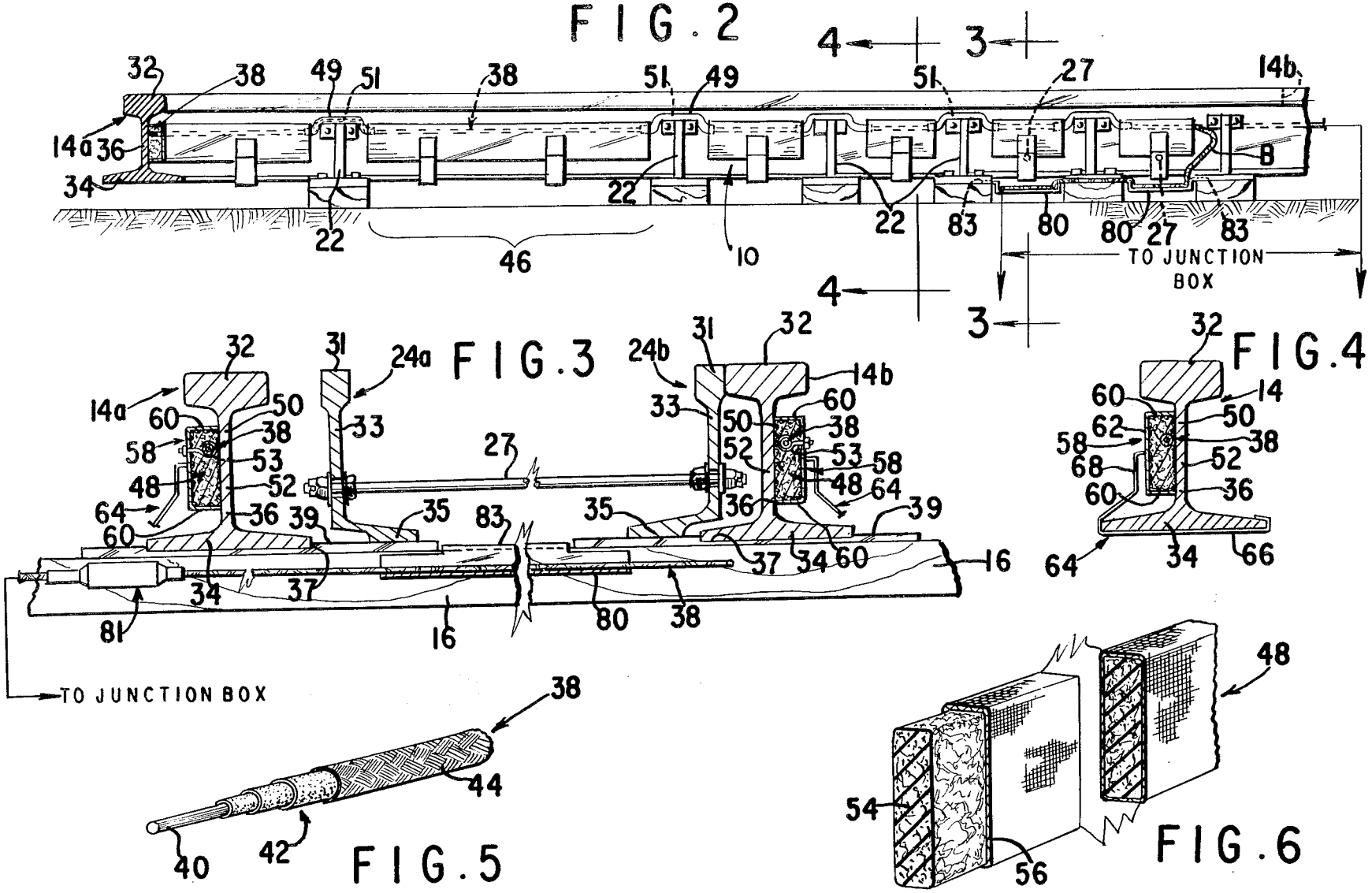
FIG. 2 is a side elevational view of the embodiment shown in FIG. 1.
FIG. 3 is a vertical cross-sectional view taken through plane 3—3 in FIG. 1, illustrating the two fixed rails, each having apparatus of the invention installed on it, and the two switch rails.
FIG. 4 is a vertical cross-sectional view similar to that shown in FIG. 3, taken through plane 4—4 in FIG. 2, illustrating particularly a device for securing the apparatus to the web of the rail.
FIG. 5 is a perspective view of a high temperature heating cable used in the apparatus.
FIG. 6 is a perspective view of a heat insulating mat used in the apparatus.

Portions of the switch rails near their ends are interconnected in conventional manner by at least one tie rod 27, two of which are indicated in FIGS. 1 and 2. Each tie rod 27 extends between and substantially parallel to two adjacent ties 16. The tie rod is axially reciprocable by a switch motor (not shown) to move the switch rails simultaneously so that one of them engages its associated fixed rail when the other is moved away from its associated fixed rail. In FIG. 1, switch rail 24b is shown engaged against the inner side of fixed rail 14b, while switch rail 24a is shown moved away from the inner side of fixed rail 14a. Accordingly, a train entering the switch from the right side of the figure will be tracked along the main track.

As shown in FIGS. 2 through 4, each fixed rail 14 includes a rail head 32, a base flange 34 and a vertically arranged web 36 interconnecting the head and base flange. The flange extends laterally of both sides of the web giving each fixed rail an I-shaped cross-section. Similarly each switch rail 24 also has a head 31 and a vertically arranged web 33. However, the base flange 35 of each extends laterally to only one side of the web 33, giving each switch rail an L-shaped cross-section.

The base flange of each fixed rail 14 is received in recesses 37 formed in a plurality of switch plates 39 each of which is secured to a tie 16 by suitable means such as spikes. The base flange 35 of each switch rail is supported by and slides on a portion of each switch plate extending from the inner side of each fixed rail (FIG. 2).

As can be seen in FIGS. 2 through 4, the apparatus of the invention includes an elongate, bendable, high temperature heating cable, generally indicated at 38, which is disposed in discrete lengths 46 in the regions between adjacent braces 22 along and in intimate contact with the outer side of the web 36 of fixed rail 14b through the entire reach 20 of the switch. A stretch of such heating cable extends similarly along the outer side of fixed rail 14a from looped portions of this cable which are arranged to heat the switch tie rods as described more particularly below. The heating cable, as shown in greater detail in FIG. 5, comprises a core 40 of a high temperature resistant heating wire that is a single solid strand of an alloy of nickel and chromium. One such alloy which is commonly used, known as Nichrome, comprises 80 percent nickel and 20 percent chromium. A suitable size is No. 12 gauge having a diameter of 0.081 inch. This wire is encased within a highly heat resistant, electrically insulating sleeve, generally indicated at 42, having good heat conductance. In the preferred embodiment, this sleeve comprises three layers of ceramic fibers braided onto the wire of strand 40 of the heating cable. Commercially available ceramic fiber made of an alumina-boria-silica composition, and identified as "Fiber AB-312" is suitable since it exhibits excellent dielectric properties and is resistant over long periods of time to temperatures as high as about 2,600° F., which exceed the temperature of the heating wire when supplied with sufficient current. Alternatively, the heat resistant electrically insulating material may be a braided fiber of other ceramic substances resistant to temperatures of the same order of magnitude, for instance, of an amorphorous silica known as "REFISIL."

The heating wire and insulating material assembly is confined inside a thermally conductive deformable heat and oxidation resistant metal sheath 44. In the preferred embodiment this sheath is an armor bat braided onto the outermost of the insulating layers and is made of high temperature resistant copper-nickel alloy wires such as those known as "INCONEL." Accordingly, the heating wire is electrically insulated from the web of the track rail by the insulating material 42 which is tightly confined in a heat-resistant, pliable sheath that embraces the thermal conductivity of the cable. It has also been found in the cable so constructed, the wire 40, the insulating layers 42 and the metal sheath expand and contract linearly nearly to the same extent in response to changes in temperature. Consequently, the insulating material experiences minimal wear due to abrasion between the wire and metal sheath, and in this way deterioration and burn-out of the heating cable is prevented.

Each of the heating cables 38 has lengths 46 thereof placed against the web of a fixed rail 14 and suitably held in place beneath the lengths by a pliable heat insulating mat generally indicated at 48. The cable lengths 46 are disposed along regions of the rail between adjacent rail braces 22 (FIGS. 1 and 2). Portions 51 of the cable 38 are bent upwardly and over the intervening braces. Therefore, the integrity of each heating cable and heating from it are maintained along the full reach 20 of the switch. The upbent cable portions 51 desirably extend through sections 49 of metal tubing, for instance copper tubing of about ⅝" internal diameter, which are bent to a form suitable cable housing for straddling the braces, and which prevent the cable from being displaced so as to fall between a brace and a rail when trains move over a loosely supported rail.

The elongate, pliable heat insulating mat, generally indicated at 48, and shown in detail in FIG. 6, is disposed lengthwise against and along each length 46 of the cable between adjacent braces and against and along portions 50 and 52 of the rail web adjacent the cable 38, as can be seen in FIGS. 3 and 4. The heat insulating mat 48 comprises an elongate mass of high temperature resistant ceramic fiber 54, preferably having a relatively high K factor as represented by a density of about eight pounds per cubic foot. A suitable material is known as "KAOWOOL." The mass of ceramic fiber is confined in a knitted flexible sleeve of high temperature resistant wire mesh 56, for instance a mesh of "INCONEL 600." This mesh prevents the fiber from creeping between the cable and the rail web. The assembled mat measures, for example, approximately 3 inches wide and 1 inch thick.

The heat insulating mat 48 placed over each length of heating cable 38 held against the rail web prevents major heat losses from the cable by convection or radiation. Accordingly, the heat generated in the cable is transferred predominantly by conduction directly into the fixed rail 14.

An elongate, substantially rigid sheet metal casing member 58, having a generally U-shaped cross-section, is fitted lengthwise over and encloses the heat insulating mat 48. The casing is, for example, about 3 inches wide and ¾ inch deep, so that the mat is compressed by it against the cable 38 and the web of the rail. The side walls 60 of the casing member bear along their edges against the rail web to confine the mat in place, as can be seen in FIGS. 3 and 4. It is preferred that the casing member 58 be made of aluminum sheeting having, for instance, a thickness of approximately 0.091 inch.

The heating cable, heat insulating mat and casing member assembly may be held in firm engagement with the web of the fixed rail as shown in FIG. 4, by a suitable number of spring clips 64. Each of these clips has a first section 66 that embraces the base flange 34 of the rail and a second section 68 that bears resiliently against the front wall 62 of the casing member. The casing member is vertically confined between the rail head 32 and base flange 34. As shown in FIG. 3, the cable 38 may be supported by hooks 53 which are bolted to the inside of front wall 62 of the casing member 58 at intervals therealong. Assembly of the cable, mat, and casing member is then done prior to securing the assembly to the rail web.

As shown schematically in FIG. 8, each of the heating cables 38 is connected to a source 70 of current [at high wattage]. This source should be capable of supplying the current [to] *through* the cable at a watt density in the range e.g. of approximately 32 Watts, per square inch of resistance wire in the cable to be heated. In the case of resistance wire of 0.081" diameter, the current supply at a watt density of 32 Watts per square inch amounts to about 96 Watts per linear foot of the cable.

In accordance with the invention, heat generated by the heating cable acts to heat the rail to a temperature that effectively prevents snow and ice from accumulating on the rail. In typical operation of the apparatus, a resistance wire of 0.081" diameter in the cable becomes heated to a temperature of, for instance, 1400° F. at an ambient temperature of about 69° F., and of about 1250° F. at an ambient temperature of 0° F. The rail to which the cable is fixed becomes heated [, for instance, to a temperature of 0° F.]. Further, the heat which sinks into the directly heated rail has been found to pass sufficiently, predominantly by conduction to the switch plates, though also by radiation, to the adjacent switch rail so that [objectional] *objectionable* accumulation of ice and snow is prevented both along the switch rail and between it and the fixed rail.

The heating cable is made to serve effectively also at the location of the tie rod and associated mechanism by an arrangement of the cable, as illustrated in FIGS. 1, 2 and 8. Specifically, the space between adjacent ties 16 which underlies a tie rod 27 interconnecting the switch rails 24, is provided with a trough 80. The cable 38 extends in series from the outer side of one fixed rail 14a, along one side of the trough, to the opposite fixed rail 14b, back along the other side of the trough to the same outer side of one fixed rail 14a. This double length of cable extending in the trough below each tie rod heats the rod by radiation and convection to prevent accumulation of ice and snow thereon. Therefore, the apparatus of the invention is effective to prevent the switch from being obstructed by ice and snow, and ensures reliable operation.

The power supply may be obtained from a conventional railroad junction box 70 located at the rail switch and may be selectively actuated by a controller 72 which receives signals from a thermocouple 74. The controller may, for example, be set to turn the power supply and hence the apparatus on at 35° F. and off at 36° F. to ensure that ice and snow does not accumulate on the switch.

FIG. 7 illustrates a connector 81 assembly suitable for electrically connecting the heating cable 38 to a normal insulated electrical conductor through which current is supplied to or from the heating cable and at other points in the apparatus circuit as shown in FIG. 8. The connector acts as a heat barrier joining the hot resistance wire with the cold non-resisting conductor. The connector comprises a copper sleeve 82 which is crimped at one end 84 onto the heating [strang] *strand* 40 . At its opposite end 86 the copper sleeve is crimped to an insulated conductor 88 connected to the power supply 70. The copper sleeve is surrounded by a ceramic heat resistant sleeve 90 which is housed in a larger diameter tube 92. The tube is crimped at one end 94 directly about the metal sheath 44 of the cable 38. At the opposite end 96, the tube is crimped about a silicon sleeve that encircles the insulation 98 of the power supply line. Accordingly, the connector forms a unitary waterproof structure in co-operation with the insulated conductor and the heating element. As noted, and as illustrated in FIG. 8, this connector construction may be used at a first location $L_1$, where the apparatus is connected to a non-resisting lead 100 from the power source 70, at second and third locations $L_2$ and $L_3$ connecting an interconnecting line 102 between the heating cables 38 attached to opposing fixed [rail] *rails* 14a and 14b, and at a fourth location $L_4$ connecting the cable attached to rail 14b to a lead 104 completing the circuit to the power source 70.

It will be appreciated from the above description that the apparatus of the present invention provides a simple yet effective means for heating railroad rails and particularly for heating and keeping railroad rail switches clear of snow and ice. Moreover, sufficient heat is generated to clear switch rails of accumulated snow and ice in reasonable periods of time.

Accordingly, although specific embodiments of the present invention have been described above in detail, it is to be understood that this is for purposes of illustration. Modifications may be made to the described railroad track heating apparatus in order to adapt it to particular applications.

I claim:

1. Apparatus for heating a railroad rail comprising:

an elongate, bendable, high temperature heating cable disposed lengthwise against and along a side of the rail web, said cable comprising an electrical resistance heating wire encased in high temperature resistant electrically insulating material confined inside a thermally conductive deformable metal sheath, an elongate, [pliable,] heat insulating mat disposed lengthwise against and along a length of said cable and portions of said web laterally adjacent thereto to prevent heat losses by convection or radiation from said cable length, said mat comprising an elongate mass of high temperature resistant ceramic fiber insulation confined [in a flexible sleeve] *by means* that prevents fiber of said mass from creeping between said cable and the rail, an elongate, substantially rigid casing member fitted lengthwise over said mat and bearing against said web side to confine said mat in place, means holding said casing member *and thereby said mat and said cable* tightly in place against the rail web; and means for supplying current at high [wattage to] *watt density through* said wire;

whereby the rail along said cable length is heated efficiently by conduction, yet burn-out of said cable is prevented, during heating of said cable by said current.

2. The apparatus of claim 1, said *insulation confining means comprising a flexible* sleeve [being] formed of a high temperature resistant wire mesh.

3. The apparatus of claim 1, said cable being supported in proper position by hooks [engaged on the inner side of] *fastened to and extending inward from* said casing member at intervals therealong.

4. The apparatus of claim 1, said cable comprising as said wire a single, central strand of chromium-nickel electrical resistance alloy, as said insulating material a plurality of layers of ceramic or silica fibers braided onto said strand, and as said sheath a heat and oxidation resistant metal armor braided onto and about the outermost of said layers.

5. The apparatus of claim 4, *wherein* said strand, said layers and said armor are constructed and assembled to linearly expand at substantially the same rate.

6. The apparatus of claim 4, said armor being braided of copper-nickel alloy wires.

7. The apparatus of claim 1, said casing member being of sheet metal and of substantially U-shaped cross-section that encloses said mat and the side walls of which bear along their edges against said web side.

8. The apparatus of claim 7, said holding means comprising a spring clip having a first section embracing the base flange of the rail and a second section bearing resiliently against a front wall of said casing member to hold the casing member against said rail web.

9. Apparatus according to claim 1, for heating a railroad rail supported laterally along a reach of said web side by a series of rail braces spaced therealong, said cable *being* disposed against said web side along each region thereof between adjacent braces, each said length of said cable having a said insulating mat disposed against and along it as aforesaid with a said casing member fitted over the mat and held against the rail as aforesaid, said cable in the vicinity of each said brace being bent upwardly and over the brace from ends of the casing members adjacent to the brace.

10. Apparatus for heating a railroad rail switch that includes two fixed rails and two switch rails movable laterally to and away from the fixed rails on underlying switch plates and interconnected by switch tie rods, said apparatus comprising:

an elongate, bendable, high temperature heating cable having a first portion disposed along the outer side of one fixed rail, second portions connected in series with said first portion, extending from the outer side of said one fixed rail toward and back from the other fixed rail under said rails in the region of each of said tie rods, and a third portion connected in series with said first and second portions disposed along the outer side of the other of said fixed rails, each said cable portion comprising an electrical resistance heating wire encased in high temperature resistant electrically insulating material confined inside a thermally conductive deformable metal sheath;

an elongate, [pliable] heat insulating mat disposed lengthwise against and along a length of each of said first and third portions of said cable disposed along the outer side of a fixed rail and disposed against portions of the rail web laterally adjacent said first and third cable portions to prevent heat losses by convection or radiation from the cable length, each said mat comprising an elongate mass of high temperature resistant ceramic fiber insulation confined [in a flexible sleeve of high temperature resistant wire mesh] *by means* that prevents fiber of said mass from creeping between the cable and said rail web;

an elongate, substantially rigid, sheet metal casing member fitted lengthwise over and enclosing each said mat, and bearing along the edges of its side walls against said wall rail web to confine the mat in place;

means holding each said [channel] *casing* member *and thereby said mat and said cable* tightly in place against the related rail web; and means for supplying current at high [wattage to] *watt density through* said wire of each said cable;

whereby said fixed rails along said cable lengths and consequently said switch plates and said switch rails are heated efficiently by conduction and said tie rods are heated by radiation and convection, yet burn-out of said cables is prevented, during heating of said cables by said current.

11. The apparatus of claim 10, said holding means comprising for each said [channel] *casing* member a spring clip having a first section embracing the base flange of the related track rail and a second section bearing resiliently against a base portion of the [channel] *casing* member to hold the [channel] *casing* member against the adjacent rail web.

12. The apparatus of claim 10, each of said cables comprising as its said wire a single, central strand of a chromium-nickel electrical resistance alloy, as its said insulating material a plurality of layers of ceramic or silica fibers braided onto said strand, and as its said sheath a heat and oxidation resistant metal armor braided onto and about the outermost of said layers.

13. The apparatus of claim 12, said armor being braided of copper-nickel wires.

14. The apparatus of claim 12, *wherein* said strand, said layers and *said* armor are constructed and assembled to linearly expand at nearly the same rate.

15. The apparatus of claim 10, further comprising a trough extending between said fixed rails in the region of each of said tie rods and supporting a second portion of said cable.

16. Apparatus for heating a railroad rail switch that includes two track rails and two switch rails movable laterally to and away from the track rails on underlying switch plates, each of the track rails being supported laterally at its outer side, along a reach thereof beside a switch rail, by a series of rail braces spaced apart therealong, said apparatus comprising:

an elongate, bendable, high temperature heating cable disposed along the outer side of each track rail through said reach thereof, each said cable comprising an electrical resistance heating wire encased in high temperature resistant electrically insulating material confined inside a thermally conductive deformable metal sheath, each said cable having a length thereof disposed lengthwise against the web of the related track rail along each region of such rail between adjacent rail braces, and having in the vicinity of each rail brace, between lengths of the cable so disposed, a portion of the cable which is bent upwardly and over the brace;

an elongate, [pliable] heat insulating mat disposed lengthwise against and along each said length of said cable and portions of the rail web laterally adjacent thereto to prevent heat losses by convection or radiation from the cable length, each said mat comprising an elongate mass of high temperature resistant ceramic fiber insulation confined [in a flexible sleeve of high temperature resistant wire mesh] *by means* that prevents fiber of said mass from creeping between the cable and said rail web;

an elongate, substantially rigid, sheet metal casing member of substantially U-shaped cross-section fitted lengthwise over and enclosing each said mat, and bearing along the edges of its side walls against said rail web to confine the mat in place;

means holding each said [channel] *casing* member tightly in place against the related rail web; and means for supplying current at high [wattage to] *watt density through* said wire of each said cable;

whereby said track rails along said cable lengths and consequently said switch plates and said switch rails are heated efficiently by conduction, yet burn-out of said cables is prevented, during heating of said cables by said current.

17. The apparatus of claim 16, said holding means comprising for each said [channel] *casing* member a spring clip having a first section embracing the base flange of the related track rail and a second section bearing resiliently against a base portion of the [channel] *casing* member to hold the [channel] *casing* member against the adjacent rail web.

18. The apparatus of claim 16, each said cable comprising as its said wire a single, central strand of a chromium-nickel electrical resistance alloy, as its said insulating material a plurality of layers of ceramic or silica fibers braided onto said strand, and as its said sheath a heat and oxidation resistant metal armor bat braided onto and about the outermost of said layers.

19. The apparatus of claim 18, said armor being braided of copper-nickel wires.

20. The apparatus of claim 18, said strand, said layers and bat having substantially the same linear coefficient of thermal expansion.

21. A method of preventing obstruction of a railroad rail switch by ice or snow, said switch including a fixed main track rail, a fixed side track rail sloped away from said main rail to form a side track, and main and side switch rails movable laterally to and away from said fixed rails inside the latter on switch plates underlying said rails, said method comprising at times of freezing weather conditions flowing electrical current at high [wattage] *watt density* through an electrical resistance wire inside a thermally conductive electrically insulating cable fixed along and next to the outer side of each of said fixed rails at the location of said switch rails, said cable comprising said wire encased in layers of electrically insulating ceramic fibers confined in a heat-resistant metal sheath, obstructing heat flow by radiation and convection from said cable with an elongate, [pliable] heat insulating mat disposed lengthwise against and along said cable and portions of the web of said fixed rails laterally adjacent thereto, said mat comprising an elongate mass of high temperature resistant ceramic fiber insulation confined [in a flexible sleeve] *by means* that prevents said mass from creeping between said cable and said rails whereby the heat generated in said cable by the current flow passes predominantly into said fixed rails by conduction, and maintaining said switch rails at above freezing temperature by conduction of heat to them through said switch plates.

* * * * *